United States Patent [19]

Summers et al.

[11] Patent Number: 5,478,882
[45] Date of Patent: Dec. 26, 1995

[54] ARTICLES FROM REINFORCED PLASTICIZED POLYVINYL HALIDE RESIN

[75] Inventors: James W. Summers, Bay Village; Jerome J. Blayne, Brecksville; Bryan M. Kazmer, Westlake, all of Ohio

[73] Assignee: The Geon Company, Independence, Ohio

[21] Appl. No.: 239,814

[22] Filed: May 9, 1994

Related U.S. Application Data

[60] Continuation of Ser. No. 152,333, Nov. 12, 1993, which is a division of Ser. No. 694,179, May 1, 1991, abandoned, which is a continuation-in-part of Ser. No. 386,831, Jul. 31, 1989, abandoned, which is a continuation of Ser. No. 99,818, Sep. 21, 1987, abandoned.

[51] Int. Cl.$^6$ ........................................... C08L 27/00
[52] U.S. Cl. ........................... 524/569; 524/296; 524/297
[58] Field of Search ............................ 524/569, 296, 524/297

[56] References Cited

U.S. PATENT DOCUMENTS

| | | | |
|---|---|---|---|
| 3,892,692 | 5/1974 | Heiberger | 524/297 |
| 4,313,985 | 2/1982 | Narita | 428/31 |

FOREIGN PATENT DOCUMENTS

| | | |
|---|---|---|
| 54-070379 | 6/1979 | Japan . |
| 60-192750 | 1/1985 | Japan . |
| 60-265841 | 9/1985 | Japan . |
| 60-266883 | 9/1985 | Japan . |
| 60-281033 | 10/1985 | Japan . |

*Primary Examiner*—Peter D. Mulcahy
*Attorney, Agent, or Firm*—Miles B. Dearth

[57] ABSTRACT

Compositions, composite articles and process for producing same are provided from a reinforced polyvinyl halide composition (A) comprising a high molecular weight polyvinyl halide resin, a plasticizer, and a reinforcement material, such as glass fibers, in combination with (B) a composition having adhesion to (A). Preferably (B) comprises a thermoplastic compound selected from the group consisting of PVC, plasticized PVC, styrene derivatives, urethane derivatives, acrylic derivatives, acrylonitrile derivatives, polyester derivatives, and mixtures thereof, with the most preferred composition being an unreinforced, plasticized polyvinyl halide composition. The composition article exhibits good strength, low sag at high use temperatures, and lowered coefficient of thermal expansion for use in contact with metal or polymeric substrates such as panels. The composition having a coefficient of thermal expansion not significantly different than the substrates in contact therewith, provides enhanced permanence of adhesion and sag resistance.

5 Claims, No Drawings

ARTICLES FROM REINFORCED PLASTICIZED POLYVINYL HALIDE RESIN

CROSS-REFERENCE TO RELATED APPLICATION

This application is a continuation of co-pending Ser. No. 08/152,333 filed Nov. 12, 1993, which is a division of Ser. No. 07/694,179, filed May 1, 1991, now abandoned, which is a continuation-in-part of Ser. No. 07/386,831 filed Jul. 31, 1989, now abandoned, which is a continuation of Ser. No. 07/099,818, filed Sep. 21, 1987, now abandoned.

This invention relates to plasticized polyvinyl halide resins reinforced with glass fibers, and articles made from such compositions.

Rigid polyvinyl halide resins, such as polyvinyl chloride are used for injection molded or extruded articles. The PVC exhibits strength and creep resistance at temperatures up to its glass transition temperature. To increase the stiffness or modulus of the PVC glass fiber reinforcement can be added. Low molecular weight PVC is chosen, particularly for injection molding applications because of the flowability.

Because high molecular weight PVC exhibits a higher viscosity, its use in injection molding is discouraged. It does not fill the molds adequately because of its limited flow. This is unfortunate because the higher molecular weight PVC exhibits better creep resistance at temperatures above the glass transition temperature of the material. Although the flowability of high molecular weight PVC can be improved with the addition of a plasticizer, this addition lowers the glass transition temperature of the material. This lowering of the glass transition temperature would indicate that creep resistance and stiffness at higher temperatures will be consequently lowered.

Although fiber reinforced rigid low molecular weight PVC exhibits adequate flow in the molding process, higher strength at high use temperatures is sought Therefore, new composition which would have the balance of flow and higher strength at high use temperatures are desired.

SUMMARY OF THE INVENTION

In one aspect, this invention is a polyvinyl halide composition comprising a mixture of polyvinyl halide resin, a plasticizer, and a reinforcement material dispersed in the resin and plasticizer mixture.

In another aspect, this invention is an article prepared from the above-described polyvinyl halide composition in a process wherein the composition is subjected to molding conditions.

In yet another aspect, this invention pertains to a composite of a reinforced, plasticized polyvinyl halide composition (A) in contact with (B) a composition having adhesion to (A). Preferably (B) comprises a thermoplastic compound with the most preferred composition being an unreinforced, plasticized polyvinyl halide composition. A process for producing said composition and composite is also disclosed. The composite can further comprise a component (C) selected from the group consisting of a metal article such as a steel or aluminum article either coated or uncoated as in an automotive body panel, a thermoset polymeric article, and a thermoplastic article. Said component (C) is integrally bonded to at least one of the surfaces of (A) and (B). Said composite in the elemental embodiment is comprised of component (A) integrally bonded with (B). Component (A) comprises: a plasticized, polyvinyl halide resin, wherein said resin exhibits an intrinsic viscosity measured according to ASTM D1243 of above 0.9, preferably said resin has an intrinsic viscosity of from 1.0 to 1.7 and most preferably said resin has an intrinsic viscosity of from 1.0 to 1.4; a plasticizer present at a level of from about 15 weight parts to about 150 weight parts per 100 weight parts polyvinyl halide resin in (A), preferably plasticizer is present from 20 weight parts to 55 weight parts per 100 weight pans polyvinyl halide in (A); and a fibrous reinforcing material selected from the group consisting of glass mat, woven glass or non woven glass fibers, stainless steel shavings, polymeric fibers, such as aramid, polyamide, polymethacrylate, fibrous derivatives of cellulose and the like. Component (A) can further comprise an elastomeric material, for example, SBR, NBR, MBS, polyacrylate, ABS, urethane, copolyester, styrenic block rubbers and combinations thereof. Elastomeric materials, if present, are added in minor proportions with polyvinyl halide without detracting from the physical properties of melt flow, storage modulus, and temperature sag resistance in (A).

The preferred reinforcement material is a high modulus material with glass fibers being the most preferred. Reinforcement material is present in (A) at from 5 to 300 weight parts per 100 weight parts polyvinyl halide resin in (A), preferably reinforcement material is present from 20 to 200 weight parts and most preferably present from 40 to 100 weight parts of reinforcement material per 100 weight parts polyvinyl halide resin in (A). Either said component (A) alone or said composite of (A) and (B) exhibit a storage modulus at 121° C. of from about $5.33 \times 10^6$ dynes/cm.$^2$ to about $1.33 \times 10^9$ dynes/cm.$^2$, and preferably exhibit a storage modulus at 210° C. of from $1 \times 10^7$ to $1 \times 10^8$ dynes/cm.$^2$.

Component (B), in intimate contact with component (A) for the composite, comprises any material which will form a decorative and/or functional component in contact with at least one surface of (A). Alternatively component (B) can include a coating, laminate or co-extruded material providing a surface and is further treated with a decorative material such as a coating or paint. For instance, (B) can be a thermoplastic decorative compound overlying (A) to provide a mar resistant finish, the color, texture or appearance being matched to suit the styling preference of the designer. Preferred materials comprising (B) are pigmented or unpigmented thermoplastic compounds having adhesion to polyvinyl halide surf aces and include PVC, plasticized PVC,, styrene derivatives, urethane derivatives, acrylic derivatives, acrylonitrile derivatives, polyester derivatives and mixtures of these composition in compounds recognized in the an for providing a functional and/or aesthetic appearance in contact with (A). Specifically, compositions comprising styrene-acrylonitrile polymers, methacrylate polymers, aliphatic polyurethane as well as impact modified versions are suitable materials for component (B). The most preferred material comprises a plasticized, stabilized polyvinyl halide composition absent said fibrous material.

The composition and composite provide sag resistance at elevated temperatures as contributed by (A) and unexpected enhanced impact properties as contributed by the combination of (A) and (B).

Despite the fact that adding the plasticizer to the resin lowers the glass transition temperature, the composition exhibits better strength at 121° C. than rigid polyvinyl halide compositions which have higher glass transition temperatures. The plasticizer improves the flowability of the composition while the crystalinity of high I.V. polyvinyl chloride and dispersed reinforcement material enhance the strength at high temperatures. The compositions of this invention are useful in the manufacture of plastic molded articles requiring high use temperatures under low load conditions. Examples of such articles include window surrounds, automotive body side moldings attached to body panels, arm rests and covers in automobiles, and in window frames.

DETAILED DESCRIPTION OF THE INVENTION

The polyvinyl halide polymers used in this invention are prepared from vinyl halide monomer. Especially preferred polyvinyl halide polymers are polyvinyl chloride polymers, and the remainder of the specification will discuss the aspects of the invention in reference to polyvinyl chloride. Any of the conventional processes for making such polymers such as mass, suspension, solution or emulsion polymerization can be used. Mass and suspension polymerizations are the preferred processes. The process to be described is a suspension process. When using the suspension process, suitable dispersing agents or suspending agents, such as known in the art, may be used. Examples of suitable dispersants are partially hydrolyzed polyvinyl alcohol, cellulose ether, starch, gelatin, and the like. The level of dispersant used will be less than about 0.5 part by weight per 100 parts by weight of monomer. Excellent results are obtained with from 0.05 to 0.3 pan by weight of dispersant per 100 pans by weight of monomer.

The polymerization is initiated with a free radical catalyst The monomer-soluble or oil-soluble catalysts that may be used in the polymerization process to produce the polyvinyl chloride polymer used in this invention are the alkanoyl, aroyl, alkaroyl, and aralkanoyl diperoxides and mono-hydroperoxides, azo compounds, peroxy ester, percarbonates, and other free radical type catalysts. As examples of such catalysts, there may be named benzoyl peroxide, lauryl peroxide, diacetyl peroxide, diisopropylbenzene hydroperoxide, 2,4-dichlorobenzoyl peroxide, naphthyl peroxide, t-butyl perbenzoate, di-t-butyl perphthahte, isopropyl percarbonate, acetyl cyclohexane sulfonyl peroxide, disecondary butyl peraxydicarbonate, 5-butyl peroxyneodecanoate, di-normal propyl peroxydicarbonate, azo-bisisobutyronitrlle, a,a'-azodfisobutyrate, 2,2'-azo-bis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an mount of catalyst in the range of about 0.01 part by weight to about 0.20 part by weight based on 100 part by weight of monomer(s).

The suspension polymerization process to produce the PVC polymers of this invention is carried out at any temperature which is normal for the monomeric material to be polymerized. Preferably, a temperature in the range of about 0° C. to about 70° C. is employed, more preferably from about 20° C. to about 55° C. In order to facilitate temperature control during the polymerization process, the reaction medium is kept in contact with cooling surfaces cooled by water, brine, evaporation, etc. This is is accomplished by employing a jacketed polymerization reactor wherein the cooling materials are circulated through the jacket throughout the polymerization reaction. This cooling is necessary since free radical polymerization reaction are exothermic in nature. It is understood, of course, that a heating medium can be circulated through the jacket, if necessary.

Although the polymer can be a copolymer of the vinyl or vinylidene halide and an ethylenically unsaturated monomer, it is preferred that the polymer or resin be a homopolymer of polyvinyl chloride. Homopolymers have physical crosslinks of high melting crystallites. The presence of high melting crystallites is evidenced by low sagging at elevated temperature by an unsupported sample under it's own weight. Polyvinyl halide homopolymers and copolymers which do not have sufficient levels of crystallites will exhibit poor elevated temperature sag resistance and are not suitable for use in the present invention. Another way of differentiating from unsuitable Polyvinyl halide copolymers for use in this invention pertains to the modulus of elasticity and permanent modulus index of the copolymer. Copolymers having a modulus of elasticity of less than 10,000 pounds per square inch per ASTM-D747 and a permanent modulus index of less than 3,000 pounds per square inch are not suitable for use in the present invention. Said permanent modulus index is defined as the 100% tensile modulus of a composition containing 17 pans dioctyl phthalate per hundred parts of copolymer and is elaborated in U.S. Pat. No. 3,892,692. Such copolymers inherently possess inadequate strength above their Tg.

The presence of an appreciable level of randomly incorporated comonomers lowers the incidence of polyvinyl halide crystallites within the polymer. Thus, homopolymers and copolymers which, in the compound form exhibit a degree of sag at 120° C. of greater than about 5 cm. using a sample cantilevered 10 cm. from a horizontal support, are not suitable in this invention; sag being measured as the distance from a horizontal line parallel to the plane of the sample support and the unsupported edge of a 0.125 inch thick by 1.0 inch wide sample extending 4 inches (10 cm.) from it's fixed support, and measured after a 1 hour heat soak at 120° C. (method A). Random copolymers of a copolymerizable comonomer such as an olefin present at 4 weight parts per 100 weight pans of vinyl halide monomer can have detrimental effects on the elevated temperature sag resistance of the composition. Block copolymers of homopolymer PVC are suitable, provided the crystallites in the polyvinyl halide polymer are not substantially eliminated so that sag resistance as outlined above rises above about 5 cm at 120° C. after one hour.

The intrinsic viscosity (I.V.) as measured by ASTM D1243 is an indication of molecular weight and has been correlated with the minimum average molecular weight range for the polyvinyl halide polymers suitable for use in the present invention. The polyvinyl chloride homopolymers having an I.V. of above about 1.0, that is, 0.9 I.V. or above, will have a sufficient crystallinity such that, in the plasticized state in combination with reinforcement the composition will provide the minimum acceptable elevated temperature sag resistance. The higher molecular weight assists in building rubbery strength at temperatures above the glass transition temperature of PVC. Any polyvinyl halide polymer with a molecular weight sufficient to provide a plasticized reinforced composition having a storage modulus at 121° C. of at least about $1.33 \; 10^7$ dynes/cm.$^2$ is suitable. The molecular weight of a polyvinyl halide polymer within the suitable range may be selected in relation to the amount of plasticizer or reinforcement to be added, but typically will be above about 1.0, that is, from 0.9 I.V. to 2.4 I.V., preferably from about 1.0 to about 1.7 and most preferably from 1.0 to 1.4 I.V.

The plasticizers useful in this invention are any of the conventional plasticizers used with polyvinyl halides and in particular, polyvinyl chloride. Included are plasticizers suitable for PVC and include those taught in *The Technology of Plasticizers,* Sears and Darby, John Wiely and Sons, New York (1982) ch.4, incorporated herein by reference. A suitable plasticizer may be polymeric, or monomeric such as a high Tg solid or a low Tg material, the preferred plasticizers being liquids. The amount of plasticizer employed is the minimum amount necessary to impart a desired flow rate to the polyvinyl chloride composition as measured by spiral flow. Spiral flow is a measure of the extent of injection melt flow under a fixed work input and predicts limitations in size and configuration of injection molding dies suitable for a given resin compound. The test employs a graduated 60-inch spiral flow mold with a standard cross section die such as a ⅛ inch by 3/16 inch rectangular cross section die used in conjunction with a Arbug injection molding machine. Generally, the mold temperature is set at 55° C., the injection melt pressure is constant at 27 psi with a 6-s injection time, 18-s clamp time, and a 5-s mold open time, giving a total cycle time of 29 s. A screw of 25 mm with L/D=18 was used. Stock temperature at the nozzle is standardized also. Spiral flow is proper when the polymer is able to flow into the pattern of the mold used. The extent of flow will vary depending on the molecular weight of the plasticizer, the molecular weight of the polyvinyl halide polymer as well as the mount of reinforcement or other material employed. With the use of a relatively lower molecular weight polyvinyl halide polymer within the specified range of I.V. a relatively lesser mount of plasticizer may be required to yield adequate spiral flow, while using a large mount of reinforcement and/or filler may require the use of a higher mount of plasticizer. It is desirable that enough plasticizer is added to impart a spiral melt flow in a 0.36 by 0.16 inch channel of above about 40 inches, and preferably of from about 50 to about 70 inches. Typically, for the high molecular weight polymers contemplated for use in this invention, the mount of plasticizer can range from about 15 pans per hundred polyvinyl halide (resin) to about 100 parts per hundred resin, and preferably from about 20 pans per hundred resin to about 55 parts per hundred resin.

Examples of suitable plasticizers include the phthalates, epoxides, aliphatic diesten, phosphates and polyesters. Preferred are the phthalates and epoxides. Examples of preferred phthalates include dioctyl phthalate, diisooctyl phthalate, diisodecylphthalate; and mixed alkyl esters such as heptyl, nonyl and undecyl phthalate. Preferred epoxides include epoxidized soybean oil, and expoxidized linseed oil. As used in the present invention, a single plasticizer can be employed, as well as blends of different types of plasticizers. An example of a preferred blend is a blend of 85 pans per hundred pans resin of dioctyl phthalate and 5 pans per hundred parts resin of epoxidized soybean oil.

The reinforcement material used in this invention is any material which can be mixed into and subsequently dispersed in the plasticized polyvinyl chloride mixture in a desired amount and which will not detrimentally effect the flowability (e.g. spiral flow) of the plasticized polyvinyl chloride mixture but which will increase or enhance a physical property of the mixture at the use temperature. Preferably, the property increased is storage modulus, although improved creep resistance, and the like are also desirable improvements. The amount of such reinforcement will vary according to the type used, the molecular weight of the polyvinyl chloride polymer, and the level of plasticizer used. Typically, for the high molecular weight polyvinyl chloride polymers and plasticizer level contemplated for use in this invention, the amount of reinforcement used to increase the storage modulus can range from about 5 parts per hundred resin to about 300 weight parts per hundred weight pans PVC resin, and preferably from about 20 weight parts to about 55 weight parts per 100 weight parts PVC. The most preferred amount of reinforcement material present is from 40 to 100 weight parts of reinforcement material per 100 weight pans of PVC.

Examples of suitable reinforcement materials sufficient to improve strength include glass, either mat, woven or non woven fibers; stainless steel shavings; polymeric fibers, such as aramid or cellulosic fibers, and combinations of more than one of these. The preferred material is glass fibers. Alternatively glass fibers are present in addition to a filler such as calcium carbonate. In yet another alternative, glass, calcium carbonate and an elastomeric material are present. The mount of glass used can range from about 5 percent to about 40 percent by weight, and preferably from about 10 to about 30 percent by weight.

The glass used in this invention can be sized or non-sized. A preferred sizing and coupling agent are disclosed in U.S. Pat. No. 4,536,360 to Rahrig, incorporated herein by reference.

The plasticized reinforced polyvinyl chloride composition of this invention can also contain other additives such as pigments, fillers, impact modifiers, processing aids, lubricants, and the like. Suitable materials which provide these function are known in the art.

To prepare the composition, it is desirable to first mix the amount of plasticizer needed to provide the desired flowability with the polyvinyl chloride resin and then add the amount of reinforcement material. As a result of the mixing, the reinforcement material, whether initially in long glass fibers or not, will be crushed and broken, and will be dispersed relatively uniformly throughout the mixture. The articles to be made from the composition will generally be prepared at high temperature under pressure. The temperature is high enough to fuse the resin particles, and the pressure is high enough to extrude an article, force the molten composition into the mold pattern, coextrude a composite article, or co-inject the material with another component. Typically such temperatures range from about 175° C. to about 235° C., and preferably from about 180° C. to about 210° C. The pressures are generally those encountered in inject/on molding and extrusion, co-extrusion, co-injection or laminating processes. The composition is also useful in compression molding, although this process is not favored as a commercial process.

The plasticized reinforced polyvinyl chloride composition has substantial strength under low load condition at high temperature. Its storage modulus at 121° C. can range from about $5 \times 10^6$ to about $1.33 \ 10^9$ dynes/cm$^2$, and preferably from about $1.33 \ 10^7$ to about $1 \times 10^8$ dynes/cm$^2$. An alternative sag test, hereinafter Method B is similar to Method A except that a sample strip 0.125 inch thick by 1 inch wide is cantilevered 1.5 inches (3.8 cm) from the horizontal support. Sag using method B is expressed in degrees and measured as the angle between the plane tangent to the deflected surface nearest the tip of the unsupported sample and the horizontal plane parallel to the supporting surface. Suitable compositions or composites of this invention exhibit less than 10°, preferably less than 5° and more preferably about 0° sag after exposure to 120° C. for 30 minutes. The measured angle is taken from a line tangential from the deflected surface and a horizontal line parallel with the undeflected surface, the cantilever distance being 1.5 centimeters. Where sag is reported in terms of Method A, as outlined above, this represents the distance between the horizontal line taken along the undeflected surface and the deflected edge of the sample that is cantilevered 4.0 inches (10 cm) from the edge of the support. This sag measurement under method A was taken at various temperatures ranging from 80° to 120° C.

The following examples illustrate the concept of this invention, but do not limit the scope of the claims.

EXAMPLE 1

A molding is prepared by injection molding from the following ingredients (unless stated otherwise, all pans are in pans per hundred resin):

| Compound | Amount |
| --- | --- |
| A polyvinyl chloride homopolymer resin (intrinsic viscosity of 1.6) | 100 |
| Hycar ® 2301 × 120 (Rubber process aid) | 8 |
| Dioctyl Phthalate | 85 |
| Barium/Cadmium (Heat Stabilizer) | 3 |
| Calcium Carbonate | 100 |
| Carbon Black | 0.3 |
| Oxidized polyethylene (Lubricant) | 0.3 |
| Paraffin Wax (Lubricant) | 0.3 |
| Glass Fiber | 33 |

The PVC process aid, plasticizer, stabilizer, filler, pigment and lubricants are powder mixed in a Henschel mixer. The powder mixture is heated and sheared to a melt in Buss Kneader compounding equipment. A second port on the Buss Kneader is equipped with a feeding screw, through which the glass fibers are added. The melt and glass mixture is sheared to uniformly disperse the glass throughout the melt. The mixture is then pelletized, and this pelletized compound is then molded into 0.125 inch thick bars at 200° C. melt temperature on an injection molding machine with a 75 ton clamp pressure. The mixture exhibits a spiral melt flow in a 0.16 inch by 0.36 inch channel of 55 inches. The mixture is cooled to allow it to solidify, and the following oven test is performed.

A 1.5 inch long 0.125 inch thick bar was placed in a clamp in an oven. After subjecting the piece to 121° C. for 30 minutes, the piece exhibited 0° sag. The storage modulus of the piece at 121° C. is greater than about $1 \times 10^7$ dynes/cm$^2$.

EXAMPLE 2

A second molding is prepared from the above-described composition in a similar manner, except that 74 weight parts glass per 100 weight parts PVC are used rather than 10 weight percent The mixture exhibits a spiral melt flow of about 46 inches. After subjecting a bar having the same dimensions as in Example 1 to 121° C. for 30 minutes, the bar exhibited 0° sag. The storage modulus at 121° C. is greater than $1 \times 10^7$ dynes/cm$^2$.

EXAMPLE 3

A composition was prepared by combining in a Henschel mixer 100 weight pans of a homopolymer PVC having an I.V. of 1.4, 10 weight pans of a crosslinked rubber used in the previous examples, 35 weight parts of Santicizer® 711 believed to represent a mixed phthalate ester ($C_7$-$C_9$-$C_{11}$), 3 weight parts of a dimethyl tin di-isooctylthioglycolate stabilizer, 0.3 weight parts carbon black, 0.5 weight parts of oxidized polyethylene, and 0.5 weight parts of paraffin wax. This mixture was heated and sheared to a melt in a Buss Condux kneader equipped with a second port as in the previous example for introducing 64 weight parts of 10 micron (0.254 μm) diameter by 6.3 mm (0.25 in.) chopped glass fibers (Owens Coming Inc.). Glass fibers were thus introduced. The uniformly fluxed mixture was pelletized. The pellets were molded into 0.125 inch (3.18 ram) thick bars at 200° C. on a 75 ton injection molding machine.

The composition of example 3 will exhibit an adequate spiral melt flow. A six inch (15.2) by 0.125 inch (3.18 min.) thick molded bar was secured and cantilevered such that four inches (10 cm.) of sample extended beyond its support. Oven sag testing was performed at temperatures given in Table 1 below.

EXAMPLE 4

A composition was prepared by combining in a Henschel mixer, 100 wt. parts of a homopolymer PVC having an I.V. of 1.4, 10 wt. parts of the crosslinked rubber used in the previous examples, 40 wt. parts of Santicizer® 711, 3 wt. parts of a dimethyl tin di-isooctylthioglycolate stabilizer, 0.3 wt. parts carbon black, 0.5 wt. parts of oxidized polyethylene, and 0.5 parts of paraffin wax. This mixture was heated and sheared to a melt in a Buss Kondux kneader equipped with a second port as in the previous example for introducing 66 wt. parts of 10 micron (0.254 μm) diameter by 6.3 mm (0.25 in.) chopped glass fibers (Owens Corning Inc.). Glass fibers were thus introduced. The uniformly fluxed mixture was pelletized. The pellets were molded into 0.125 inch thick bars at 200° C. on a 75 ton injection molding machine.

The composition of example 4 will exhibit an adequate spiral melt flow. A six inch (15.2 cm.) long by 0.125 inch (3.17 ram) thick molded bar was cantilevered such that four inches of sample extended beyond its support. Oven sag testing was performed for 1 hour at the temperatures given in table I below.

COMPOSITE IMPACT PROPERTIES

The compositions of Examples 3 and 4 were heated in an oven and extruded into strips. The single layer strips were cut to size for testing. Other single layer strips (A) were hot laminated to a plasticized, unreinforced stabilized PVC film (B) and compression molded to simulate a co-extruded composite. The 2-layered (capped) strips and the untapped single layer strips were evaluated at room temperature (RT) for instrumented puncture impact expressed as maximum force in pounds (N), peak energy and absolute energy in ft.-lb./in. (J/M). Instrumented puncture impact testing is based on drop dart impact test as in (ASTM-D2444). Testing of capped strips simulates the actual performance of a fabricated composite useful for example in body side molding and bumper strips in particular, for the automotive industry.

| | EXAMPLE | | | |
| --- | --- | --- | --- | --- |
| | 3 | | 4 | |
| | uncapped | capped | uncapped | capped |
| Max. Force | 192 | 244 | 143 | 198 |

-continued

| | EXAMPLE | | | |
|---|---|---|---|---|
| | 3 | | 4 | |
| | uncapped | capped | uncapped | capped |
| Lb. force (N) | (860) | (1085) | (636) | (880) |
| Peak Energy | 29 | 33 | 21 | 33 |
| Ft.-lb./in. (J/M) | (1547) | (1761) | (1120) | (1761) |
| Absolute Energy | 59 | 73 | 51 | 65 |
| Ft.-lb./in. (J/M) | (3148) | (3896) | (2721) | (3469) |

As is noted from the above data, Examples 3 and 4 exhibit higher instrumented puncture impact for the capped embodiment compared with the single layer, ie. uncapped strips. This is in contrast to a conventional multicomponent article of a thermoplastic over a metal strip. In such an embodiment, it has been observed that impact strength of a metal core/thermoplastic composite is not greater than the impact strength of the metal component alone. In other words, the thermoplastic component does not contribute to the design strength of the assembled article and there is thus no synergy of strength enhancement between the metal and the overlying thermoplastic. Whereas, in the present invention, directed to the above exemplified article, impact properties were consistently improved for the thermoplastic composite as contributed to component (B) and seen in the impact strength of the capped strips. This was unexpected.

COEFFICIENT OF LINEAR EXPANSION

The Examples 3 and 4 were extruded into strips and evaluated for determination of their coefficient of linear thermal expansion (COE) as expressed in in/in $\bullet°C.\times10^{-5}$ (ASTM-D696) between $-30°$ C. and $+30°$ C. In addition, COE was measured at elevated temperature between $+30°$ C. and $+30°$ C. per the *Test Procedures of the automotive Composite Consortium* 1990, Automotive Composite Consortium, Section 9.2.

| | Example | |
|---|---|---|
| | 3 | 4 |
| COE[1] | 1.7 | 1.5 |
| COE[2] | 0.4 | 0.4 |

[1]($-30$–+$30°$ C.) (in/in. · °C. × $10^{-5}$)
[2]($+30$–+$80°$ C.) (in/in. · °C. × $10^{-5}$)

| Reference Materials— | |
|---|---|
| COE (in/in. · °C. × $10^{-5}$) between $-30°$ C. AND $+30°$ C.: | |
| Steel | 0.8 |
| Aluminum | 1.3 |
| Stainless Steel | 1.9 |
| Glass reinforced Polypropylene | 2.0 |
| Rigid PVC | 6.5 |
| Polyphenylene oxide (PPO) | 1.4 |

It is noted the unexpected advantage of reduced COE for Examples 3 and between $+30°$ C. and $+80°$ C. Comparison with the reference materials illustrates a desirable closer match between the COE of the metals and the composite of the invention. This property is useful in articles derived from the composite in contact with such materials. The reinforced composite COE is lower than the COE for polypropylene, rigid PVC and similar to polyphenylene oxide engineering thermoplastic. One economic advantage therefore lies in the use of the composition of the present invention as compared to higher cost engineering thermoplastics such as PPO.

CO-EXTRUDED COMPOSITE

The composite of this invention can be co-extruded. This process is derived from the melt-forming of a multicomponent article from two or more than two process streams, hereinafter termed co-extrusion for the sake of simplicity. The compositions of Examples 3 and 4 were each co-extruded in a laboratory co-extrusion device to produce a 24 mm×2 mm core reinforced strip (A) capped with an outer co-extruded un-reinforced cap (B) of approximately 0.002 inches. The cores consisted of Examples 3 and 4 compositions and the outer cap consisted of a flexible, un-reinforced, plasticized, stabilized PVC composition. Such a cap can thus be utilized as a decorative, weatherable, mar resistant component and can be neutral, clear or formulated with colorants and/or pigments in addition to weatherability improving additives understood in the Art.

The preferred materials for (B) have advantages owing to the mutual adhesion between thermoplastics. This mutual adhesion is high for the preferred plasticized PVC composition of (B) and obviates the need for adhesive means which are generally required to permanently adhere dissimilar components. Owing to the sag resistance of the core reinforced plasticized PVC at elevated temperatures, the molded, extruded, co-molded or co-extruded article can withstand elevated continuous use temperatures without sagging when attached to a substrate, for example a metal panel at several discrete points.

In the conventional article, a metal core is combined with a thermoplastic molding composition. A surface of the metal component, for example, is attached or adhered to a panel by attachment or adhesive means respectively. One aspect of this invention resides in the attachment of the reinforced plasticized polyvinyl halide composition or a composite to a metal panel. The low COE at elevated temperature for the composition is preferably not significantly different than the panel material. This reduced difference in expansion allows for improved permanence of adhesion of the composition when adhered to a panel. Moreover, there is reduced stress between the composition and the attachment means which would otherwise create stresses in the composition leading ultimately to buckling distortion or adhesive failure. This is a critical consideration where adhesive means are used since, at elevated temperatures there is typically a reduction in flexural modulus and static shear strength of adhesives. The increased stress on the adhesive can be disruptive to the established bond and greater failure of bonds and sagging of the article might result. Thermal expansion as well as sagging are greatly minimized by the use of the composite of the present invention. Attachment of the composition or composite to the panel material is enhanced along with weight savings and improved design simplicity and reliability.

OVEN SAG RESISTANCE

Examples 3 and 4 were evaluated for sag by Method A at various elevated temperatures in an oven after a one hour heat soak. The sample cantilevered strips extended four inches (10 cm.) beyond the support. The distance was measured from the deflected tip to the height of the support.

TABLE 1

| Temperature | Example 3 Sag (cm.) | Example 4 Sag (cm.) |
|---|---|---|
| 80° C. | 0.4 | 0.5 |
| 90° C. | 0.6 | 0.6 |
| 100° C. | 0.8 | 0.6 |
| 110° C. | 1.5 | 1.0 |
| 120° C. | 1.5 | 1.4 |

As can be seen in the oven sag results in Table 1, Examples 3 and 4 molded plasticized reinforced compositions exhibit good sag resistance. It is preferred to achieve a sag resistance of less than about 5 cm. under these conditions, and most preferably, sag is less than about 2 cm. for a 10 cm. cantilevered sample after 1 hour at 120° C. By comparison, for a rigid conventional molded fiber reinforced PVC compound there is an upper limit on I.V enabling the minimum flowability. Such a rigid lower I.V. PVC even with a higher Tg would have deflected completely, exhibiting no sag resistance (10 cm. sag) at 120° C. The sag resistance exhibited by the compositions of this invention represents a significant strength improvement at temperatures above the Tg for the PVC composition. This evidences the critical importance of crystallites present in PVC which are not disrupted even at which is a least 40 degrees Celsius (120° C.) above the glass transition temperature. In addition, it is shown above that Example 4 which contained 40 wt. parts of phthalate plasticizer compared to 30 wt. parts for Example 3, did not exhibit increased sag at elevated temperatures and is unexpected since the Tg for this example is lower than the Tg for example 3. This is a desirable feature relative to the contribution of plasticizer for further enhanced processibility.

Various changes and modifications may be made in carrying out the present without departing from the spirit and scope thereof. These changes are to be considered as part of the invention. While in accordance with the Patent Statutes, the best mode and preferred embodiment has been set forth. The scope of the invention is not limited thereto, but rather by the scope of the attached claims.

We claim:

1. A fiber reinforced, plasticized polyvinyl halide composition, comprising:
   (a) 100 weight parts of a high molecular weight homopolymer of polyvinyl chloride resin wherein said resin has an intrinsic viscosity per ASTM D-1243 of from 0.9 to 1.7;
   (b) from 20 to 55 weight parts of a plasticizer per 100 weight parts of said homopolymer; and
   (c) from 5 to 40 weight percent glass fibers dispersed uniformly throughout said composition, wherein after (a) and (b) have been combined and mixed, said glass fibers are added to the combination comprising (a) and (b) and wherein said composition in the compound form exhibits a degree of sag at 120° C. not greater than about 5 cm. using a sample cantilevered 10 cm. from a horizontal support using a 0.125 inch thick sample.

2. The composition of claim 1 wherein said plasticizer is a phthalate ester.

3. The composition of claim 2 wherein the plasticizer is dioctyl phthalate.

4. An article prepared by the process of subjecting the composition of claim 1 to temperatures sufficient to melt and fuse the polyvinyl halide resin, followed by cooling the article.

5. The article of claim 4, exhibiting a storage modulus of greater than $1 \times 10^7$ dynes/cm$^2$ at 121° C.

* * * * *